United States Patent
Poag et al.

(10) Patent No.: US 6,300,693 B1
(45) Date of Patent: Oct. 9, 2001

(54) ELECTRIC MOTOR COOLING JACKET ASSEMBLY AND METHOD OF MANUFACTURE

(75) Inventors: Andrew F. Poag, St. Louis; Peter K. Bostwick, Maryland Heights, both of MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/516,871

(22) Filed: Mar. 2, 2000

Related U.S. Application Data

(60) Provisional application No. 60/122,979, filed on Mar. 5, 1999.

(51) Int. Cl.[7] .................................................. H02K 5/06
(52) U.S. Cl. ................................ 310/54; 310/58; 310/59; 310/64; 310/89
(58) Field of Search .................................. 310/52, 54, 58, 310/59, 60 R, 60 A, 64, 254, 89; 29/596–598

(56) References Cited

U.S. PATENT DOCUMENTS

| | | | |
|---|---|---|---|
| 2,862,120 | * 11/1958 | Onsrud | 310/52 |
| 3,601,884 | * 8/1971 | Kemeny | 29/DIG. 44 |
| 4,516,044 | * 5/1985 | Bone | 310/64 |
| 4,854,373 | * 8/1989 | Williams | 310/54 |
| 5,592,039 | * 1/1997 | Guardiani | 310/54 |
| 5,859,482 | 1/1999 | Crowell et al. | |
| 5,906,236 | * 5/1999 | Adams et al. | 310/54 |
| 5,929,543 | * 7/1999 | Zeyen et al. | 310/54 |
| 5,939,808 | * 8/1999 | Adames | 310/89 |
| 5,997,261 | * 12/1999 | Kershaw et al. | 310/54 |
| 6,133,659 | * 10/2000 | Rao | 310/89 |

OTHER PUBLICATIONS

Electrical Apparatus Service Association, Inc., *Principles of Large AC Motors*, 2000 (The motor shown in Fig. 6 is admitted to be prior art.).
Faye C. McQuiston and Jerald D. Parker, *Heating, Ventilating, and Air Conditioning: Analysis and Design*, before 1993, p. 619, Third Edition, John Wiley & Sons Publishers.
Frank P. Incropera and David P. DeWitt, *Fundamentals of Heat and Mass Transfer*, 1990, pp. 119–121, Third Edition, John Wiley & Sons Publishers.
J.P. Holman, *Heat Transfer*, 1981, pp. 41–44, Fifth Edition, McGraw–Hill Book Company.
William C. Reynolds and Henry C. Perkins, *Engineering Thermodynamics*, 1977, pp. 567–568, Second Edition, McGraw Hill Book Company.

* cited by examiner

Primary Examiner—Tran Nguyen
(74) Attorney, Agent, or Firm—Senniger, Powers, Leavitt & Roedel

(57) ABSTRACT

A cooling jacket assembly for cooling the stator of an electric machine. The assembly includes an annular cooling jacket body comprising coaxial inner and outer cylindric shells, heat transfer fins in the annular space between the inner and outer shells defining coolant flow channels, and end caps connected to opposite ends of the inner and outer shells. Coolant flows through an inlet in one of the end caps and is directed through the flow channels along at least one serpentine path to an outlet. The serpentine path comprises a plurality of parallel sections extending axially of the cooling jacket body. In one aspect of the invention, each section of the serpentine path comprises a group of two or more flow channels defined by a plurality of adjacent fins.

18 Claims, 10 Drawing Sheets

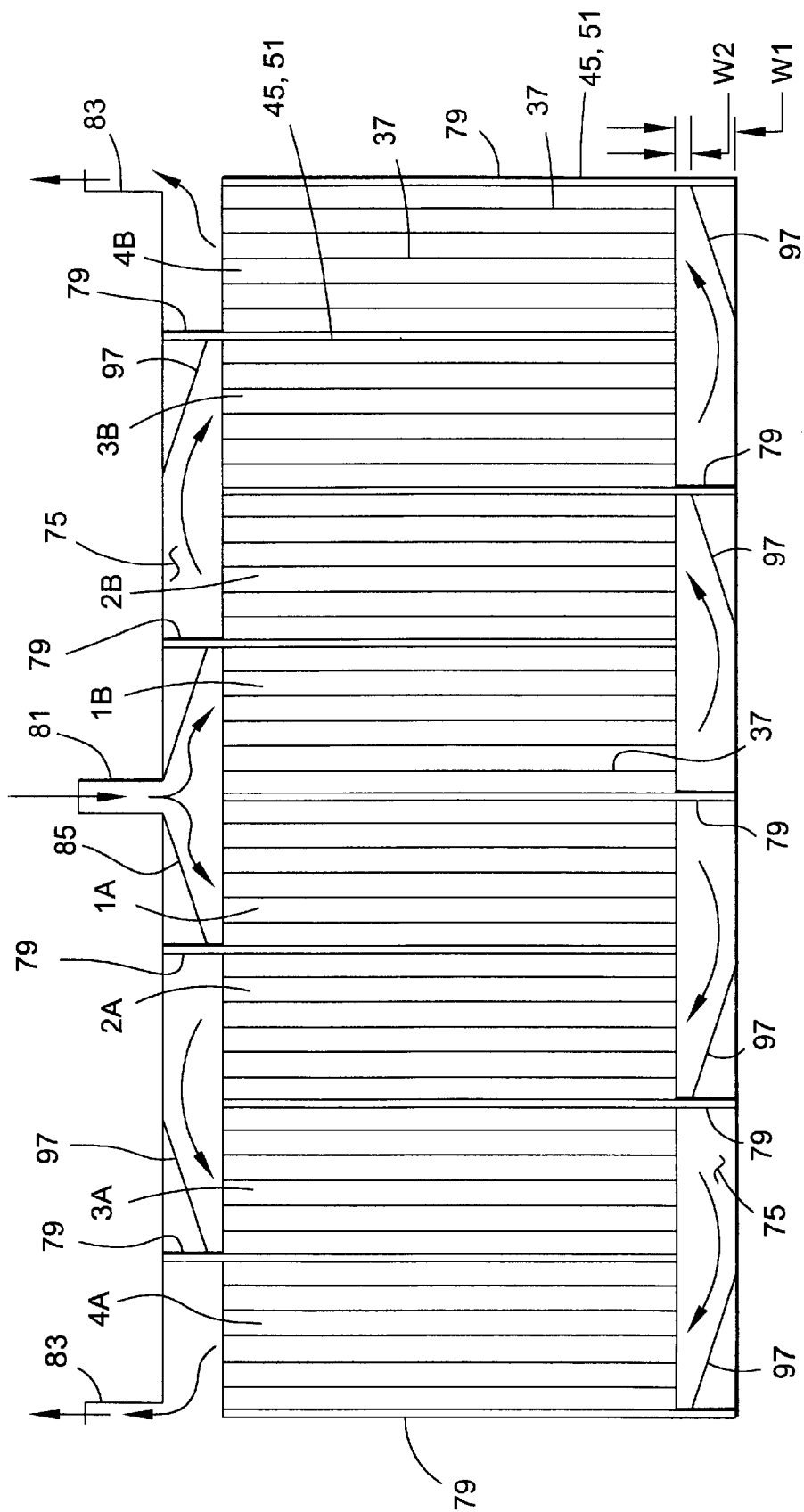

ELECTRIC MOTOR COOLING JACKET ASSEMBLY AND METHOD OF MANUFACTURE

This application claims the benefit of U.S. Provisional application No. 60/122,979, filed Mar. 5, 1999, which is hereby incorporated by reference in its entirety.

BACKGROUND OF THE INVENTION

This invention relates generally to systems for cooling electric machines and, more particularly, to a cooling jacket assembly for cooling an electric motor and/or generator having high heat-dissipation requirements.

This invention has special (albeit not exclusive) application to electric machines (motors and generators) operating at high speeds, such as a brushless permanent magnet motor operating at speeds in excess of 50,000 rpm and driven by fuel-powered turbines to generate electrical power. These machines typically generate considerable heat and must be cooled by suitable means. One such means is by circulating a suitable cooling fluid through a cooling jacket in heat exchange contact with the stator of the machine. One example of such a system is described in U.S. Pat. No. 5,859,482.

Prior systems have suffered various drawbacks, including expense, difficulty in manufacture and assembly, and other disadvantages. There is a need, therefore, for a system which is economical to manufacture, easy to assemble, and capable of effective cooling.

SUMMARY OF THE INVENTION

Among the several objects of this invention may be noted the provision of an improved cooling jacket for an electric machine (e.g., motor and/or generator); the provision of such a jacket which comprises an assembly of parts which are relatively economical to manufacture and easy to assemble; the provision of such an assembly which is adapted for the efficient cooling of an electric machine having high heat dissipation requirements; and the provision of a method for making such an assembly.

In general, a cooling jacket assembly of the present invention is used for cooling the stator of an electric machine. The assembly comprises an annular cooling jacket body comprising coaxial inner and outer cylindric shells defining an annular gap therebetween. The inner shell has an outer surface and a cylindric inner surface defining a cylindric cavity for receiving the stator so that the stator is in heat transfer contact with the inner surface. Heat transfer fins in the annular space between the inner and outer shells define flow channels for the flow of coolant therethrough. A first annular end cap is connected to one end of the cooling jacket body and defines an annular conduit around the body in fluid communication with the flow channels. A second annular end cap is connected to an opposite end of the cooling jacket body and defines an annular conduit around the body in fluid communication with the flow channels. An inlet is provided on one or the other of the end caps for flow of coolant into a respective conduit, and an outlet is provided on one or the other of the end caps for flow of coolant out of a respective conduit. Barriers in the conduits direct fluid from the inlet through the flow channels to the outlet along at least one serpentine path comprising a plurality of parallel sections extending axially of the cooling jacket body and connected by the conduits. Each section of the at least one serpentine path comprises a group of two or more flow channels defined by a plurality of adjacent fins.

In another aspect of the invention, the aforementioned serpentine path for the coolant comprises at least first, second and third parallel sections extending axially of the cooling jacket body and connected by said conduits. Each section of the serpentine path comprises a group of flow channels defined by a plurality of adjacent fins. The arrangement is such that coolant is adapted to flow in a first axial direction through the flow channels of the first section, then in a second axial direction generally opposite the first through the flow channels of the second section, and then in said first axial direction through the flow channels of the third section.

In still another aspect of this invention, cooperating registration elements are provided on the body and the first and second end caps to properly orient the end caps relative to the body during assembly of the body and the end caps.

In accordance with another aspect of the present invention, at least one ramp is positioned in the aforementioned conduits and extends across the inlet end of at least one of the parallel sections of the serpentine path for effecting a more uniform distribution of fluid through the flow channels of the section.

The present invention is also directed to a method of making a cooling jacket assembly. The method comprises the steps of extruding a cooling jacket metal body comprising coaxial inner and outer cylindric shells defining a stator-receiving cavity, and fins extending between the shells defining flow channels for the flow of coolant therethrough. The method also includes the steps of casting first and second annular end caps, applying the first and second end caps to the cooling jacket body using registration elements to ensure proper orientation of the end caps relative to the body to provide conduits communicating with said flow channels, and affixing the end caps to opposite ends of the metal body in positions wherein fluid is able to flow through the jacket body in the flow channels and conduits. The method further comprises mounting the stator in said stator-receiving cavity.

Other objects and features of the present invention will be in part apparent and in part pointed out hereinafter.

BRIEF DESCRIPTION OF THE DRAWINGS

FIG. 11 is a schematic view illustrating the flow path of coolant through the cooling jacket.

Corresponding parts are designated by corresponding numbers and characters throughout the several views of the drawings.

DETAILED DESCRIPTION OF THE PREFERRED EMBODIMEENT

Figure 1:
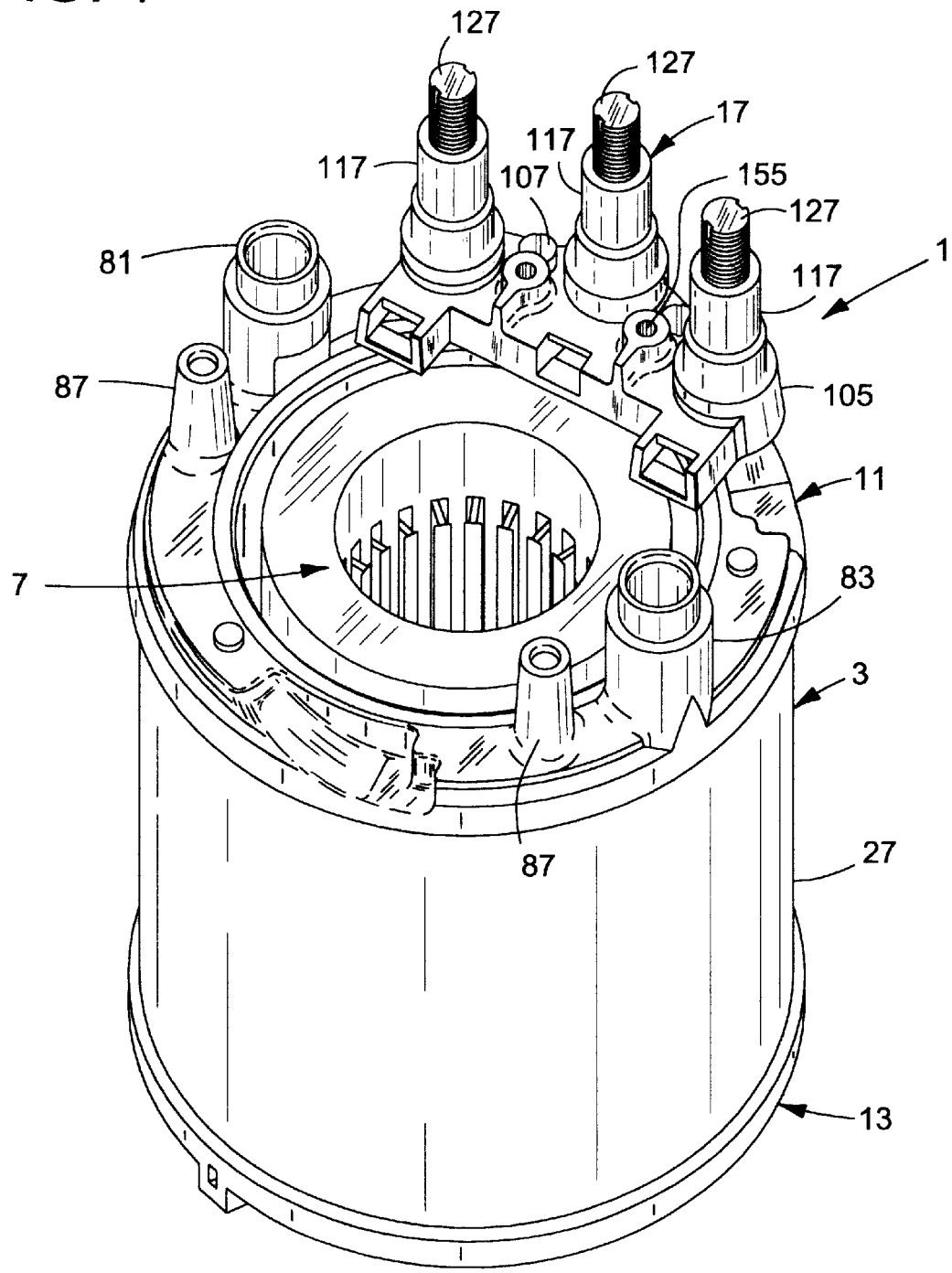
FIG. 1 is a perspective of a cooling jacket assembly of the present invention.
Figure 2:
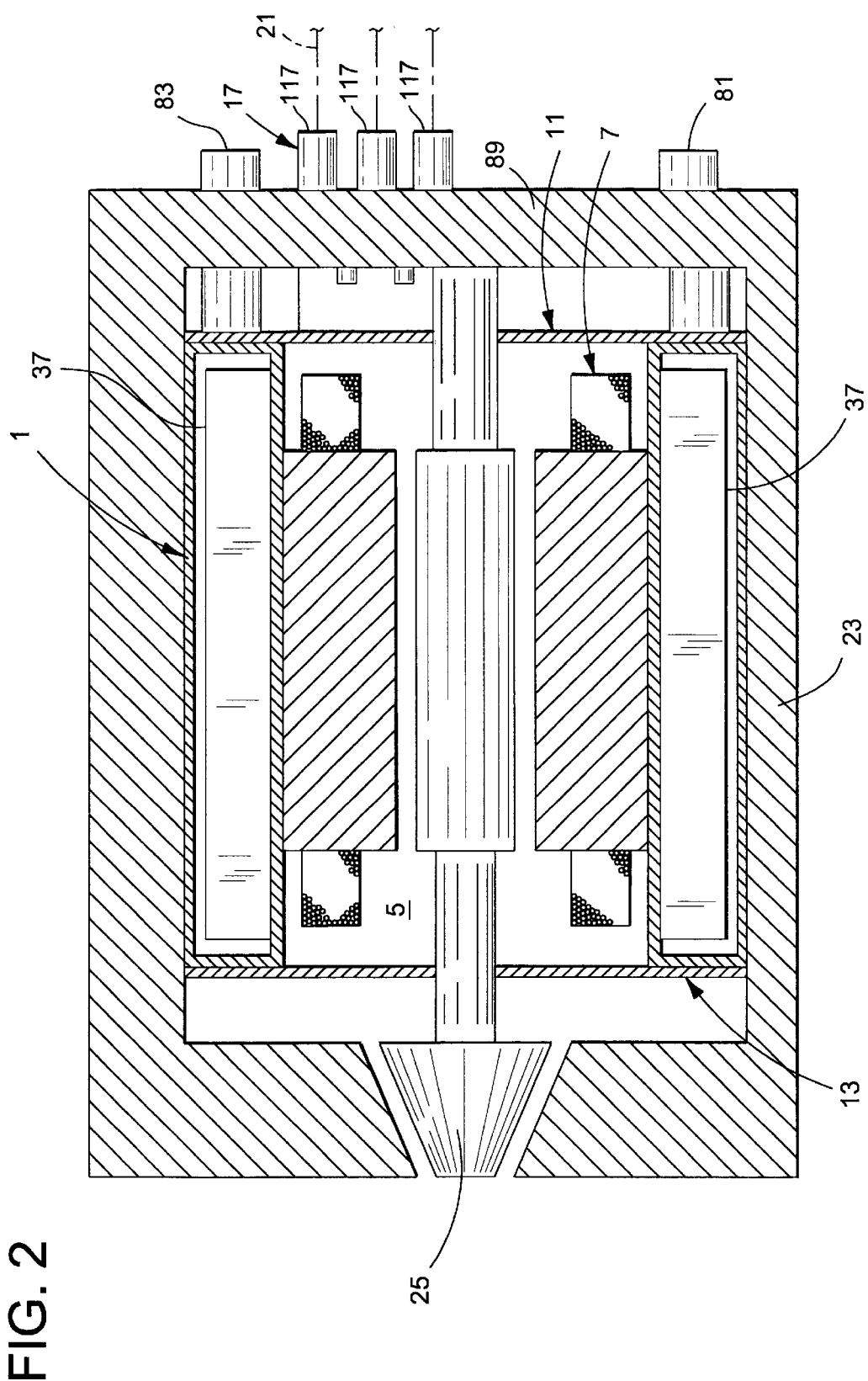
FIG. 2 is a schematic view showing the cooling jacket mounted in a turbine housing receiving the rotor of a turbine.

Referring now to the drawings, and particularly to FIGS. 1 and 2, a cooling jacket assembly of the present invention is designated in its entirety by the reference numeral 1. The assembly includes an annular body, generally designated 3, defining a cavity 5 for receiving the stator assembly 7 of an electric machine, first and second annular caps generally designated 11 and 13, respectively, connected to opposite ends of the body, and a connector, generally designated 17, removably securable to the first end cap 11 for electrically connecting the stator to suitable external power lines 21. (The term "electric machine" as used herein is intended to refer to a machine operating as a motor or as a generator. By way of example, the assembly may be mounted in a turbine housing 23 with the stator in position for receiving the rotor 25 of a gas-powered turbine capable of operating the electric machine at high speeds (e.g., 60,000–70,000 rpm) to generate electrical power for delivery to a desired destination via the power lines 21.

Figure 3:
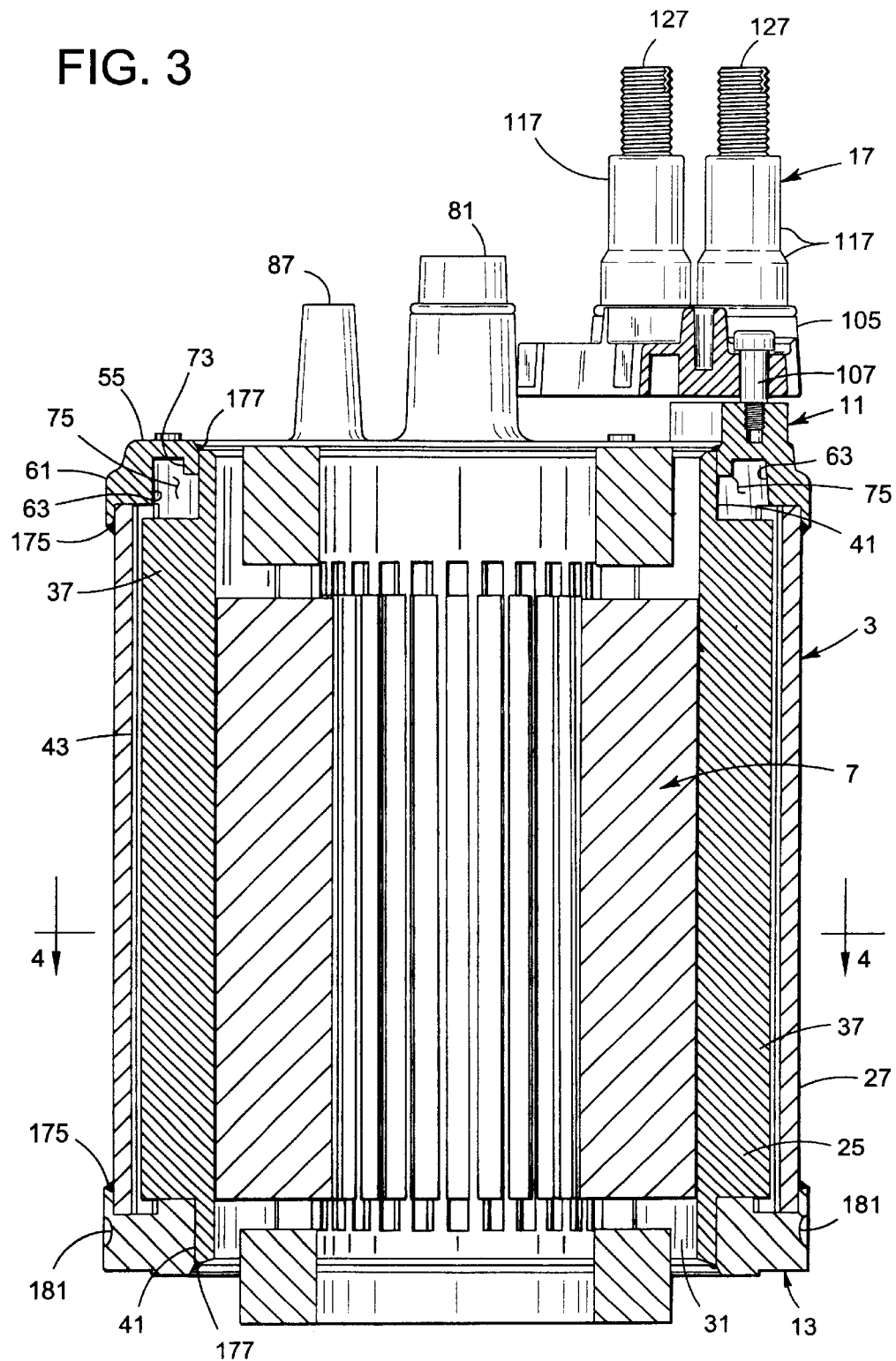
FIG. 3 is a vertical sectional view of the assembly.
Figure 4:
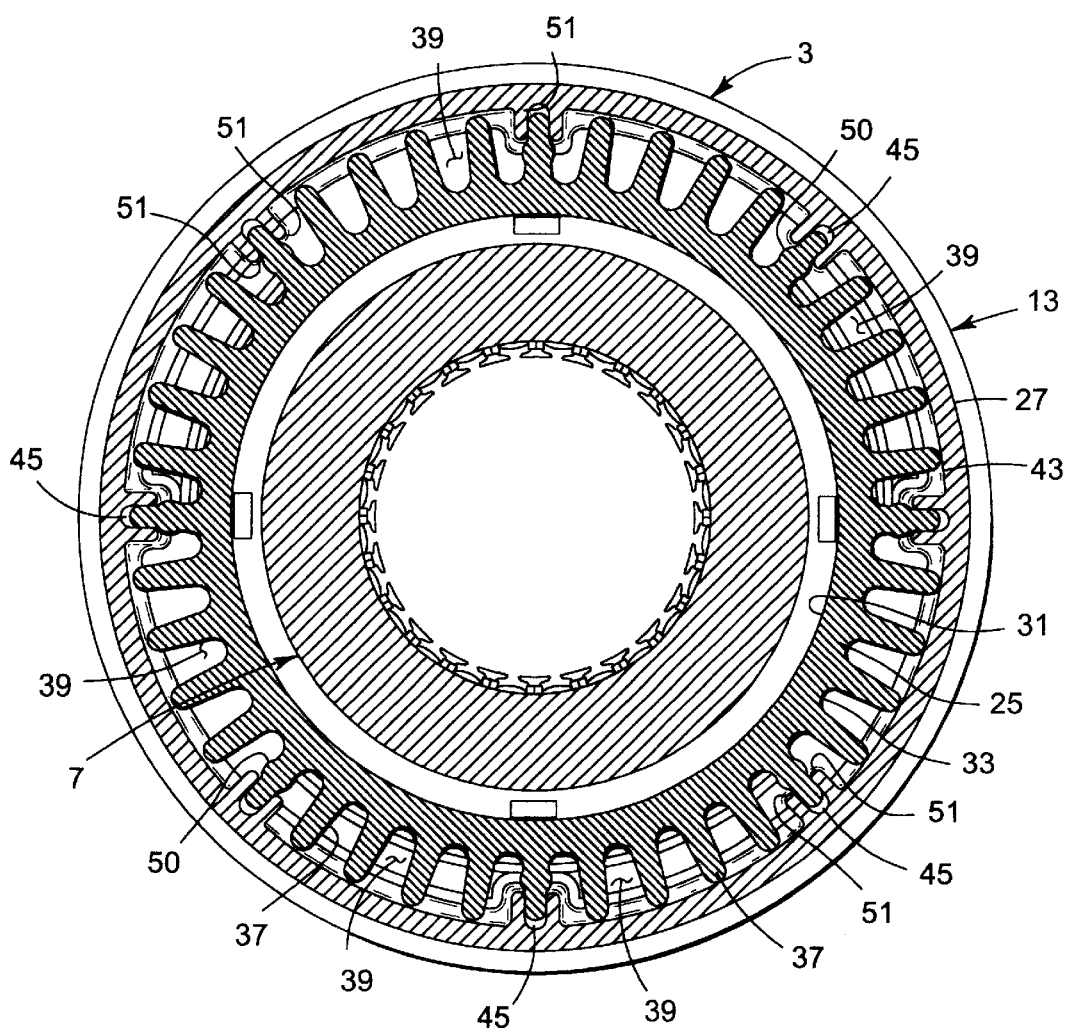
FIG. 4 is a section taken on line 4—4 of FIG. 3.
Figure 6:
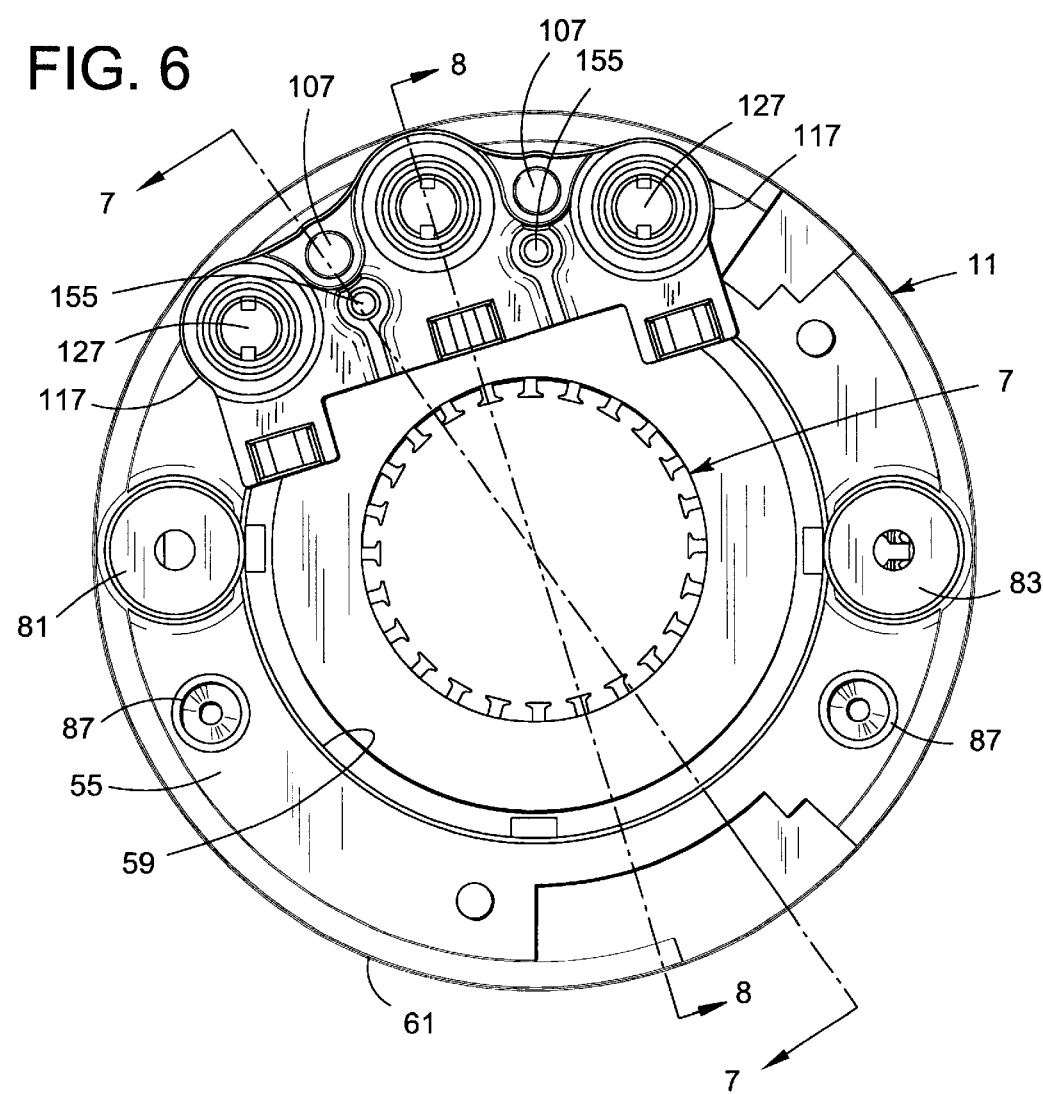
FIG. 6 is a top plan view of the assembly.

As shown best in FIGS. 3 and 4, the body 3 of the cooling jacket assembly includes a cylindric inner shell 25 and a cylindric outer shell 27 surrounding the inner shell and spaced therefrom to define an annular gap or space between the two shells. The inner shell has a cylindric inner surface 31 which defines the stator cavity 5 and which is in heat transfer contact with the laminated metal body of the stator for drawing heat therefrom. The inner shell 25 also has a cylindric outer surface 33 and a plurality of radial fins 37 project radially out from the surface into the annular gap between the two shells. The fins extend in parallel fashion along a major portion of the length of the cooling jacket. As will be understood by those skilled in this field, the number of fins and the thickness of the fins on the inner shell will vary depending on the particular heat transfer requirements. The fins define a series of fluid flow channels 39 extending axially of the inner shell 25, each pair of adjacent fins 37 defining one flow channel therebetween. The fins 37 terminate short of the ends of the inner shell 25 to form a pair of smooth-surface collars 41 at the ends of the shell.

The outer shell 27 is coaxially disposed around the inner shell 25 and has an inner surface 43 formed with a series of axial slots 45 running from one end of the shell to the other for receiving certain fins 37 of the inner shell. As shown, each slot 45 is defined by a pair of closely-spaced parallel ribs 51 extending axially along the shell from one end to the other. The slots are spaced from one another around the inner shell to segregate or divide the fins and the flow channels defined thereby into a predetermined number of groups. As illustrated in the drawings, the circumferential spacing between the slots 45 defined by the ribs 51 is shown as 45 degrees, dividing the fins and flow channels into eight separate groups, with each group including six fins 37 defining five parallel flow channels 39. As will be discussed in more detail later in this description, cooling fluid is adapted to flow through the cooling jacket along at least one and preferably two or more serpentine paths, each path comprising a plurality of parallel sections extending axially of the inner and outer shells, the width of each section being defined by the spacing between two adjacent slots 45. (Each section includes the fins and flow channels of one of the aforementioned groups). The angular spacing of the slots 45 relative to one another and the number of fins and flow channels in each group defining a section of the serpentine path may vary, depending on various factors, so long as there is a substantially uniform distribution of fluid flow over the fins. The slots 45 are configured for a sealing fit with the side faces of respective fins. The specific fins 37 receivable in these slots have means 50 for visual identification to ensure proper orientation of the inner and outer shells 25, 27 during assembly. In the embodiment shown in FIG. 4, the slot fins 37 are somewhat shorter than the other fins and are formed with with lateral projections, but other visual indications may also be used. All of the fins have rounded tips. The inner shell 25 has a close tolerance fit inside the outer shell 27 so that when the two shells are assembled, the tips of the fins 37 have a close clearance fit with the inside surface of the outer shell, the clearance being sufficient to permit ready assembly of the inner and outer shells (e.g., about 0.030 to 0.040 in.).

The inner and outer shells 25, 27 are preferably extruded metal parts of a suitable heat conductive material such as aluminum. As will be described later, using an extrusion process minimizes the number of machining operations compared to other methods, such as a press fit of the outer shell on the inner shell.

Figure 5:
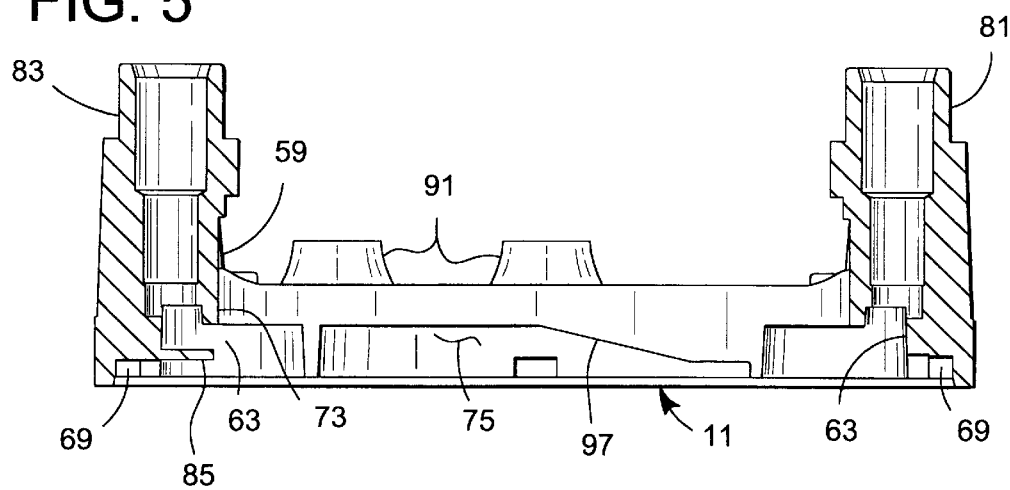
FIG. 5 is a sectional view of a first end cap of the assembly.
Figure 5A:
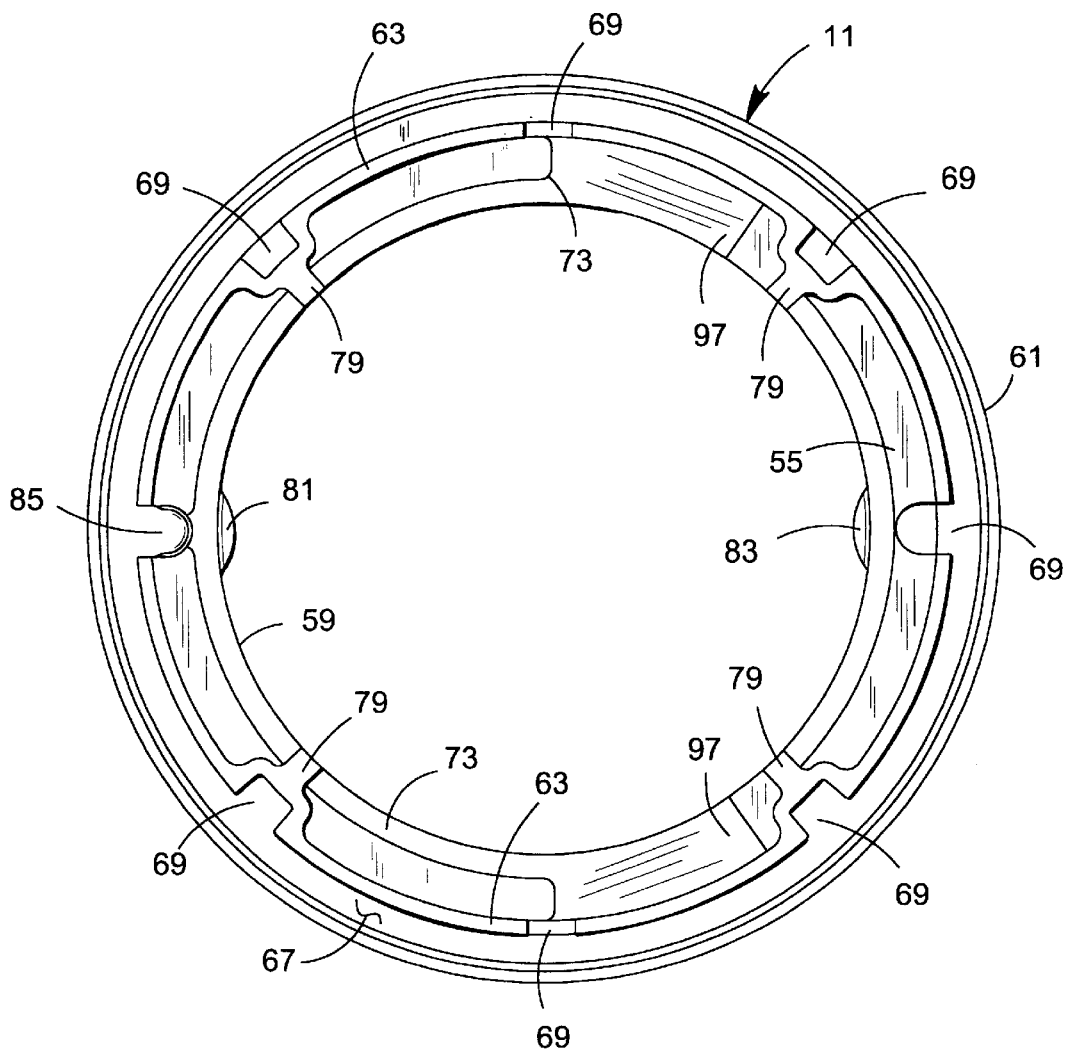
FIG. 5A is a bottom plan view of the first end cap.

The first end cap 11 (shown as the upper end cap in the drawings) is preferably a cast metal part, also of aluminum for example, having an annular end wall 55 with a circular inner edge defining a central opening 59 therein concentric with the inner and outer shells 25, 27, and an annular side wall 61 extending down from the end wall 55 (FIGS. 3 and 5A). An inner annular wall 63 extends down from the end wall generally concentric with the side wall 61 and is spaced radially inward from the side wall. The lower ends of the two walls 61, 63 define a relatively shallow circular groove 67 therebetween for receiving the upper end of the outer shell 27 in sealing fit relation. The inner wall 63 has a series of recesses 69 therein for receiving end portions of the slot-defining ribs 51, the ribs having a sealing fit within these recesses. The recesses and ribs (which may be broadly referred to as axial projections) serve as registration elements or keys to properly orient the end cap 11 and the body 3 of the cooling jacket. Alternatively, the recesses could be in the body 3 and the axial projections on the end caps. Other types of registration elements could also be used, although it is preferable that the elements be formed as integral parts of the cooling jacket body and end caps for simplicity and efficiency of manufacture and assembly.

When the inner and outer shells are assembled, the upper ends of the fins 37 abut the annular inner wall 63 of the first end cap, and the upper collar 41 of the inner shell is received in the central opening 59 of the end cap with the outer surface of the collar in sealing engagement with a peripheral lip 73 around this opening. A annular conduit 75 is formed around the inner shell 25 between the collar 41 and the inner wall 63 of the end cap 11. This conduit 75 is in fluid-flow communication with the flow channels 39 defined by the fins 37. The conduit 75 has a number of barriers 79 extending thereacross to prevent the flow of fluid therepast, the spacing between the barriers being twice the angular spacing between the rib-receiving recesses 69. The barriers 79 are located at alternating rib-receiving recesses to provide for the aforementioned serpentine flow through the cooling jacket, as will be described.

The first end cap 11 has an inlet 81 for connection to a source of liquid coolant (e.g., a mixture of water and ethylene glycol) circulating in a suitable heat exchange circuit (not shown) for flow of liquid coolant into the annular conduit 75 at a location midway between two barriers 79, and an outlet 83 for exit of coolant from the conduit. In the illustrated embodiment, the inlet and outlet are located 180 degrees apart, but this may vary. A deflector 85 is provided at the lower end of the inlet 81 for dispersing the pressurized inlet stream or jet of coolant and directing flow into the conduit 75 in opposite directions away from the inlet. The deflector may be a separate part suitably secured to the first end cap or it may be cast integral with the first end cap.

Figure 7:
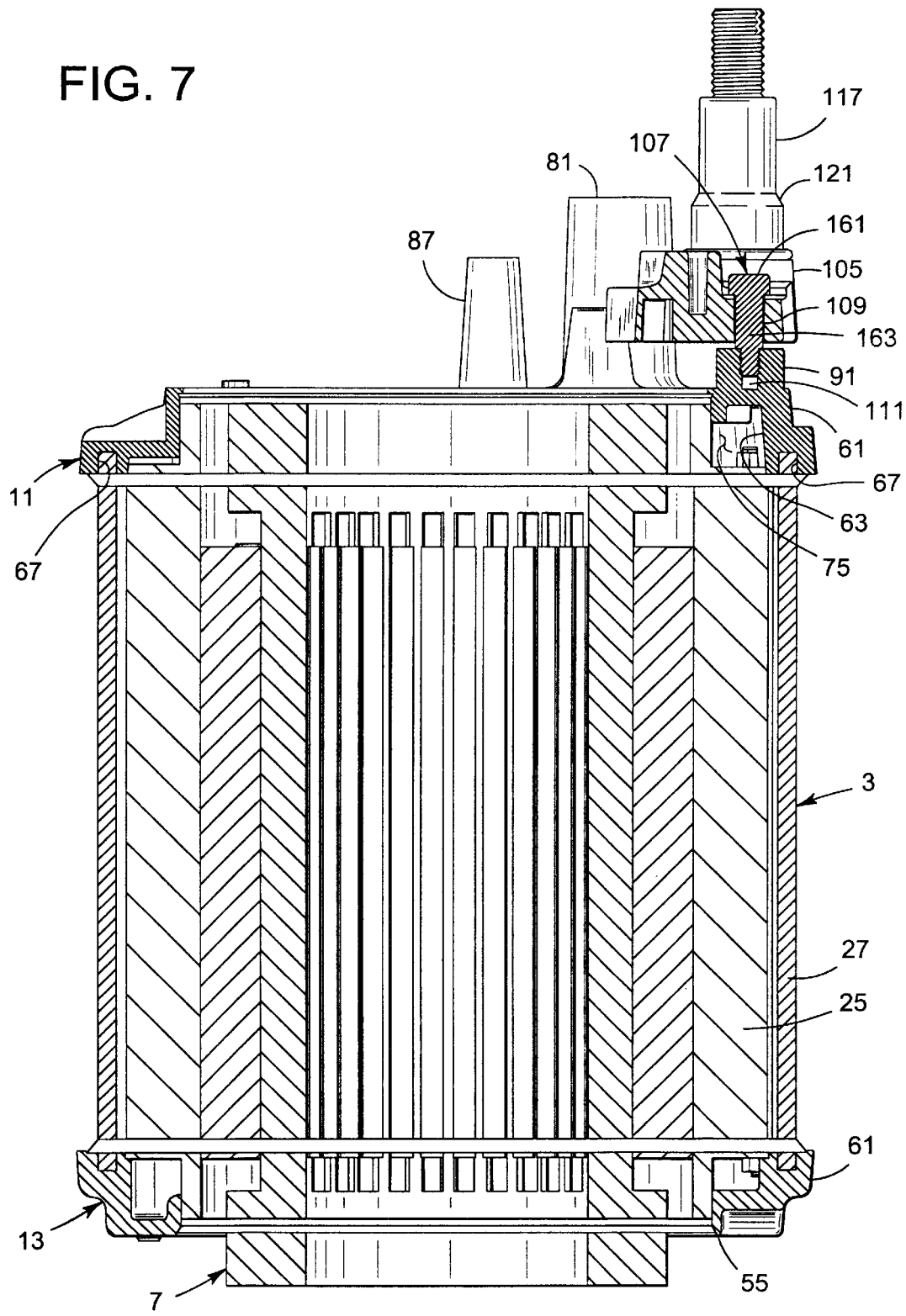
FIG. 7 is a sectional view taken on line 7—7 of FIG.6.

The first end cap is formed with a pair of tubular mounts 87 having threaded bores therein for receiving fasteners to secure the cooling jacket in place, as to the bulkhead 89 of the turbine housing 23 shown in FIG. 2. The end cap is also formed with a pair of bosses 91 (FIGS. 7 and 8) for attaching the connector 17 to the end cap, as described in more detail later.

The second end cap 13 has a construction very similar to that of the first end cap 11 and corresponding parts are indicated by corresponding reference numbers. The end caps should be oriented relative to one another so that the barriers 79 in the annular conduit 75 formed by the second end cap are circumferentially offset relative to the barriers in the annular conduit formed by the first end cap. This offset should be by an amount equal to one-half the spacing between the barriers, or the width of one group of fin flow channels 39 between respective slots 45. The arrangement is such that coolant entering the inlet 81 flows into the conduit 75 of the first end cap 11 and is directed by adjacent barriers 79 on opposite sides of the inlet to flow along two separate serpentine flow paths, with substantially one-half the coolant flowing in serpentine fashion in one direction around the body 3 of the cooling jacket and substantially one-half flowing in serpentine fashion in the opposite direction around the body until both volumes of flow enter the conduit at the outlet 83 and exit the cooling jacket.

FIG. 11 is a schematic illustrating the path of coolant flow through the jacket from the inlet to the outlet. As an aid to explanation, the various axial sections of the serpentine flow paths have been numbered, the axial sections of one flow path being numbered 1A–4A and axial sections of the other flow path being numbered 1B–4B. Coolant entering the inlet 81 is deflected to flow in opposite directions in conduit 75, with a first volume flowing along the serpentine path comprising sections 1A–4A, in sequence, and a second volume flowing along the serpentine path comprising sections 1B–4B, in sequence. The coolant from both flow paths exits the outlet 83. The advantage of this arrangement is that the flow rate of coolant is substantially uniform through all flow channels, and the velocity of the coolant is maintained at a high level with low pressure drop. As a result, heat transfer from the inner shell is maximized). By way of example, the flow rate through the cooling jacket may be about 6 gpm at an inlet pressure of 45 psi.

To promote the even distribution of cooling liquid through all of the flow channels 39 of each group of flow channels, the end caps 11, 13 may be formed with ramps 97 (shown schematically in FIG. 11) in the conduits 75 at locations corresponding to the inlet ends of the parallel sections 1A–4A, 1B–4B of the serpentine coolant flow path.

Each ramp 97 extends in the conduit across the entire width of a section (this portion of the conduit being referred to as a "header region"), with the ramp starting at the most upstream flow channel 39 of the section and extending past the most downstream flow channel of the section and terminating at the respective barrier 79 on the end cap. The ramp serves to progressively increase the flow resistance at the inlet ends f the flow channels from one channel to the next in the downstream direction to force a more even distribution of fluid into the flow channels of a respective section of flow channels. Stated another way, the ramp 97 causes a more uniform static pressure at the entry ends of the flow passages 39 of the section, resulting in a more even distribution of flow through the passages of each section. (Without the ramp, fluid speed and static pressure would tend to vary at the entry ends of the flow passages, resulting in more flow through some passages and less through others). The ramp 97 should be of suitable shape and at a suitable angle to maintain fluid flow speed at a constant value throughout the is header region. The ramps are preferably formed as integral parts of the end caps 11, 13, but they could be formed as separate parts.

By way of example but not limitation, a cooling jacket of the present invention may have the following approximate dimensions: inside diameter of the outer shell 27—6.1 in.; length of flow channels 39—6.4 in.; depth of flow channels 39—0.55 in.; fin thickness—0.16 in.; number of flow channels 39 per section of serpentine path—five; circumferential extent of each section of serpentine path—45 degrees; circumferential extent of each ramp 97—45 degrees; effective width of conduit 75 (W1 in FIG. 11) at the upstream end of each section having a ramp 97—0.50 in.; effective width of conduit 75 (W2 in FIG. 11) at the downstream end of each section having a ramp 97—0.16 in. (the decrease in effective conduit width being due to the ramp 97 in the conduit).

The first and second end caps 11, 13 are preferably cast metal parts of suitable material, preferably the same material as the body of the cooling jacket (e.g., aluminum).

Figure 8:
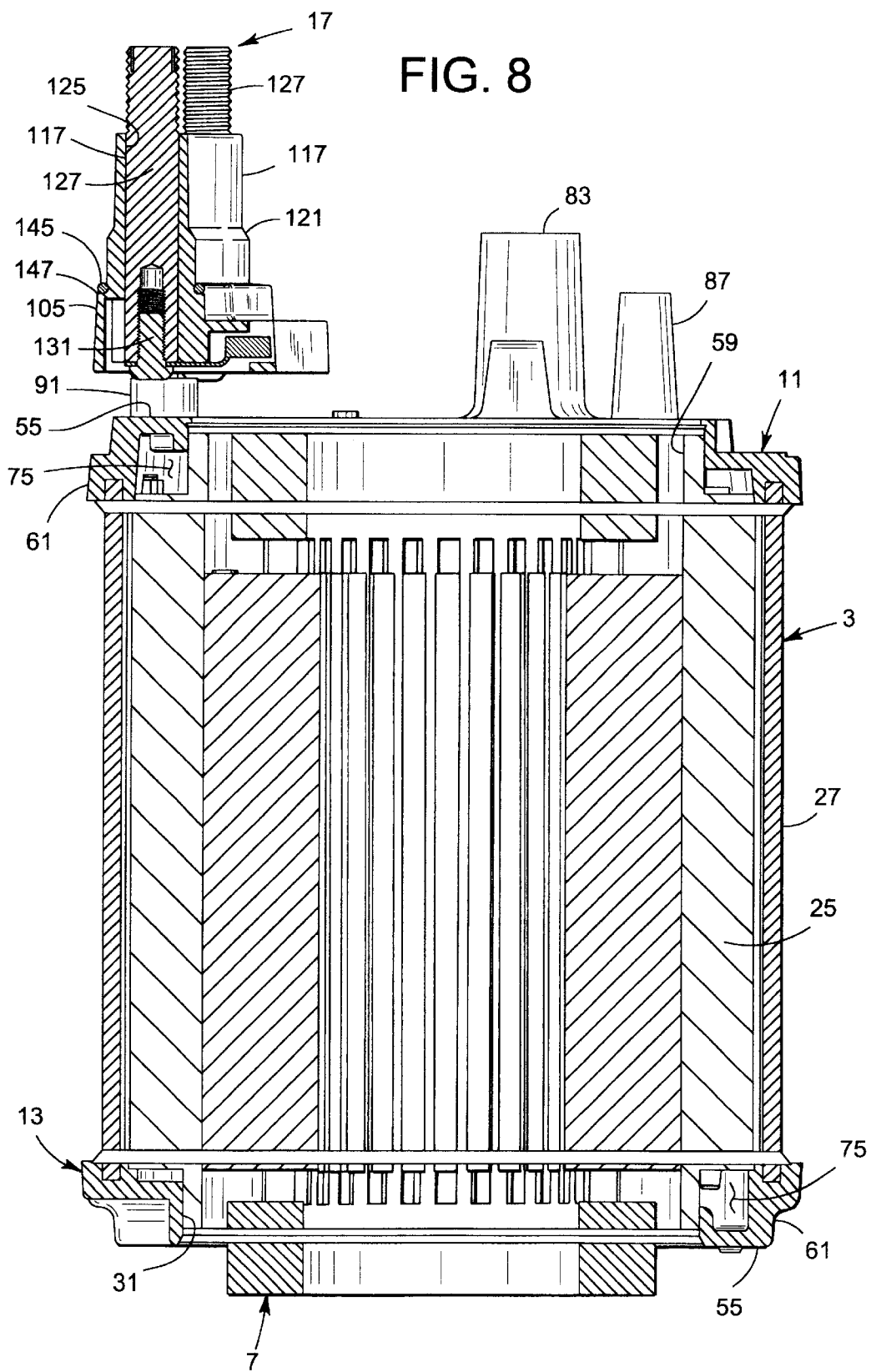
FIG. 8 is a sectional view taken on line 8—8 of FIG. 6.
Figure 9:
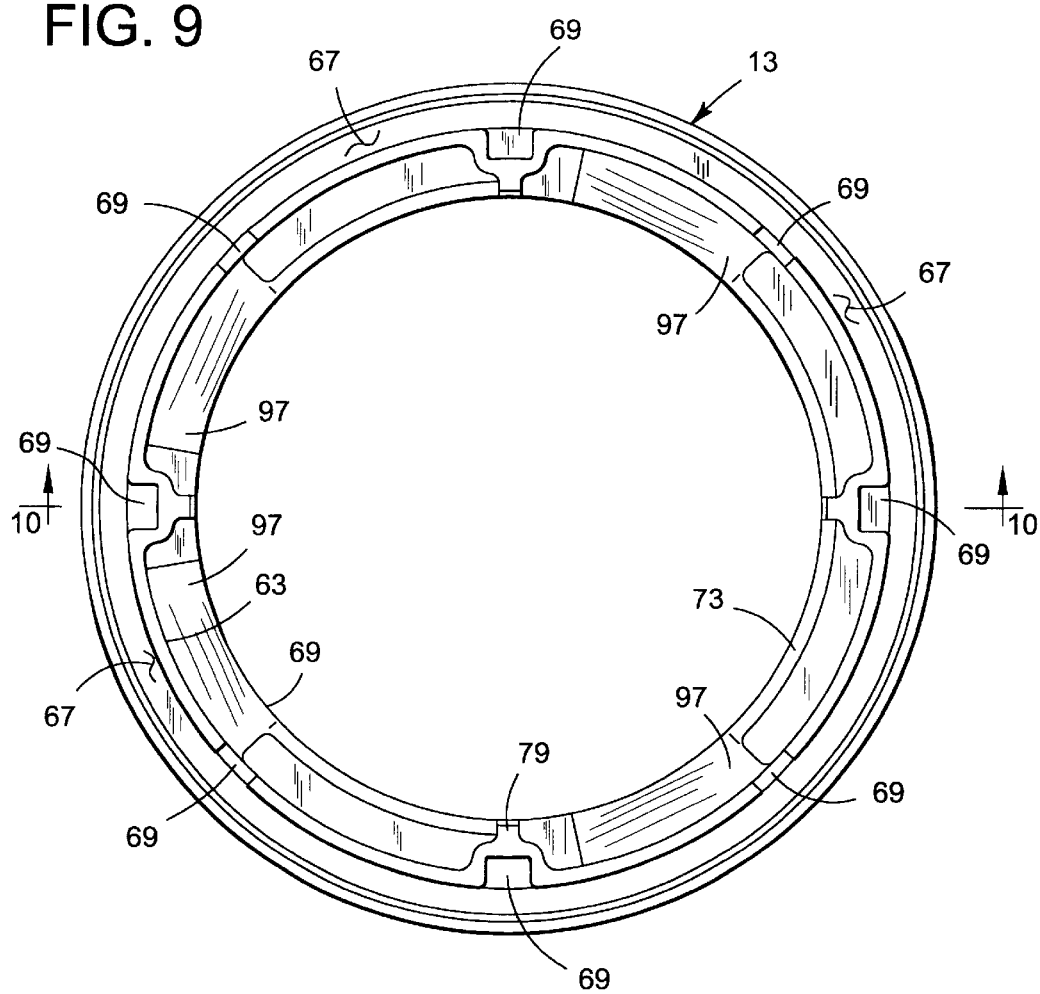
FIG. 9 is a top plan view of a second end cap of the assembly.
Figure 10:
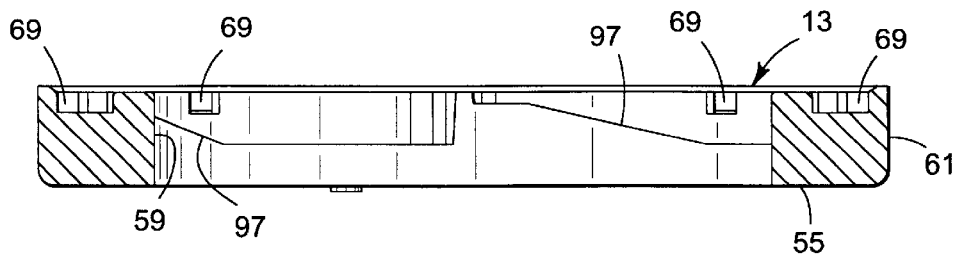
FIG. 10 is a sectional view on lines 10—10 of FIG. 9.

The connector 17 for connecting the stator connections to the power lines 21 comprises a base 105 secured to the first end cap 11 by screws 107 extending down through threadless openings 109 in the base into tapped bores 111 in the two mounting bosses 91 projecting from the first end cap. The base 105 has a plurality of connector posts 117 extending therefrom, in this case three posts for a three-phase electric motor/generator or machine, but it will be understood that the number of posts may vary depending on the motor/generator or machine. The posts project through holes in the bulkhead 89 of the housing 23. The posts are chamfered as indicated at 121 to guide the posts 117 into and through these holes. The base and posts are preferably molded as an integral unit from a suitable high temperature plastic. As shown in FIG. 8, each post 117 comprises a tubular member defining a bore 125 which extends completely through the base for receiving therein a conductor stud or pin 127 of suitably conductive material, such as a beryllium copper alloy. The lower end of the pin is internally threaded for receiving a screw 131 to connect a respective stator lead to the pin 127, and the upper end of the pin is externally threaded for receiving a pair of nuts or the like for securing the power lines 21 to the conductor in conventional fashion. An 0-ring seal (not shown) is provided on each post for sealing against the outside face of the bulkhead. Similarly, an 0-ring 145 seated on a shoulder 147 on each post 117 seals against the inside face of the bulkhead. The connector 17 is drawn tight against the bulkhead by a pair of mounting screws extending through clearance holes in the bulkhead into bores 155 in the connector base 105.

The two screws 107 which fasten the connector 17 to the first end cap 11 of the cooling jacket are preferably shoulder screws (see FIG. 7), each having a head 161 and a shank 163. The shank has a large-diameter non-threaded portion receivable in one of the non-threaded openings 109 in the base, and a smaller-diameter threaded portion receivable in the tapped opening 111 in a respective mounting boss 91. The length of the non-threaded portion of the shank 163 is somewhat greater than the thickness (height) of the base 105 at the bore 109 so that when the shoulder screw is threaded down to a point where the non-threaded portion of the shank engages the mounting boss 91, there is sufficient clearance (e.g., 0.100 in.) to provide limited lost motion in the axial direction between the connector and the first end cap. Similarly, some clearance (e.g., a total of 0.030 in.) is provided between the non-threaded portion of the shank 163 and the bore 109 in base to permit limited rocking of the connector and the end cap relative to one another. These two limited lost motions allow for some misalignment and tolerance differences which might otherwise interfere with mounting the assembly in the housing 23. This feature may also be referred to as a self-alignment feature. The heads 161 of the two shoulder screws 107 have sockets for receiving a conventional tool.

It will be observed from the foregoing that the parts of the cooling jacket assembly of the present invention are easy to fabricate. As noted previously, the inner and outer shells 25, 27 are extruded parts which can be extruded in relatively long segments and cut to the desired length. The extrusion operation is economical and the resulting parts are generally less porous than if formed by a casting operation. Further, the machining required to finish the extruded parts is minimal. The inner shell requires only two machining operations, the first being to form the end collars 41 and the second being to machine the inside surface of the shell to a high-tolerance smooth finish (e.g., within a tolerance of 0.0005 in.) so there is a close interference fit (e.g., a 0.003 in. nominal interference fit) between the stator and the shell for good heat transfer. (The stator body is preferably also machined to have the same close tolerance finish The outer extruded shell requires no machining after the extrusion is cut to length. The cast end caps 11, 13 also require only minimal machining, namely, an operation to form the grooves 67, and it is contemplated that this operation may be eliminated by an appropriate casting change.

While the inner and outer shells described above are extruded as separate parts, it is contemplated that they may also be extruded as a single part.

In accordance with this invention, the parts of the cooling jacket assembly are also easy to assemble. The outer shell 27 is slidably telescoped over the inner shell 25 with the shorter fins 37 on the inner shell received in respective slots 45 in the outer shell. (It makes no difference which shorter fin is received in which slot Following this step, one of the end caps 11, 13 is placed on a respective end of the assembled body 3 in a position in which the outer shell is received in the groove and the slot-defining ribs 51 are received in respective recesses 69 in the end cap. In the case of the first end cap 11, the inlet 81 should be disposed directly in line with one of the slots 45. The other end cap is then placed on the opposite end of the body in a similar position, but with the barrier walls 79 of the end cap circumferentially offset relative to those of the opposite end cap to provide for the flow of coolant along the serpentine paths described above. After the end caps are in place, they are permanently and sealingly secured to the body of the cooling jacket, preferably by a welding process, and more preferably by a MIG welding process. Each end cap is sealed to the body of the jacket by two weld joints 175, 177 (FIG. 3), the first weld joint 175 being between the side wall 61 of the end cap and the outer shell 27, and the second weld joint 177 being between the inside peripheral lip 73 on the end wall and a respective end collar 41 of the inside shell 25. After the welding has been completed, the inside surface of the inside shell of the jacket and the outside surface of the stator are machined to close tolerance to ensure concentricity and a close interference fit of the stator inside the cooling jacket. The outside diameters of the end caps 11, 13 are also machined to have a close tolerance fit in the housing 23 so to ensure concentricity of the assembly with the rotor when the cooling jacket is mounted in the housing. The jacket assembly is then placed around the stator.

For efficient thermal transfer between the cooling jacket and stator, the inner surface of the inner shell 25 should have a close interference fit with the stator, as noted above. The cooling jacket is preferably made of aluminum for ease fabrication, cost and heat transfer characteristics. If aluminum is used, as preferred, consideration must be given to the fact that aluminum and the steel of the stator have substantially different coefficients of thermal expansion. As a consequence, interference conditions must be defined such that the outer shell does not lose contact with the inner shell at maximum operating temperature and that stress limitations of the material of the inner shell are not exceeded at minimum operating temperature conditions. The jacket assembly can be mounted on the stator using a "shrinkfit" process in which the cooling jacket is heated to a suitable temperature (e.g., 400–500 degrees F.) sufficient to cause it to expand to receive the stator and then allowed to cool to cause the jacket to shrink down to bring the machined inner surface 31 of the inner shell 11 into an interference fit and heat transfer contact with the machined outer surface of the stator. The inner shell 25 of the assembly should have a wall thickness sufficient to withstand the stresses resulting from this process. A wall thickness of 0.25 in. has been found to be suitable under conditions where the stator is of steel, the inner shell is of aluminum (AL6061–T6), and the motor is operating in a temperature range of –20 to 195 degrees F. If the cooling jacket is made of the same metal as the stator core, or a metal having substantially the same coefficient of thermal expansion, then the inner shell 25 and stator can be machined to have a close interference fit (e.g., a 0.0003 to 0.0023 in. nominal interference fit) without regard to difference in coefficients of thermal expansion.

Following assembly of the cooling jacket and stator the stator leads are connected to the conductor pins 127 of the connector 17, and the connector is fastened to the first end cap 11 by the shoulder screws 107. The entire assembly is then ready to be installed in the motor/generator housing 23, using two screws threadable into openings 155 in the base 105 of the connector and two screws threadable into the tubular mounts 87 on the first end cap to tighten the connector against the bulkhead. The self-alignment feature described above makes this installation relatively easy. The second end cap 13 is preferably provided with recesses 181 (FIG. 3) for receiving one or more Woodruff keys engageable with the housing to hold the cooling jacket against rotation relative thereto. Next, the external power lines 21 are connected to the conductor pins 127 of the connector, and the inlet and outlet of the cooling jacket are connected to a coolant re-circulation loop containing a heat exchanger for dissipating the heat from the coolant after it exits the cooling jacket. The final step is to mount the rotor inside the stator.

In use, coolant flows through the inlet 81 of the jacket where the deflector 85 breaks the momentum of the stream of coolant entering the inlet and directs the flow in opposite directions into the conduit 75. The barrier walls 79 on opposite sides of the inlet direct coolant though the first two groups of flow channels 1A, 1B toward the opposite end of the jacket and thence along the serpentine paths previously described before exiting the jacket through the outlet 83. As the coolant flows along these paths, it contacts the fins 37 of the inner shell and convects heat from the fins, thereby cooling the inner shell and thus the stator encircled by the jacket. Due to the fact that the coolant flows substantially unrestricted through the flow passages, there is low pressure drop in the flow channels 39. The velocity of the coolant remains high (e.g., 3–10 meters per sec., although the speed will vary depending on application) for turbulent flow and greater efficiency of heat transfer. The ramps 97 further ensure a substantially uniform distribution of flow through all flow channels of any given section and over all fins for increased thermal efficiency. It will be noted that while the temperature of the body 3 of the cooling jacket may reach relatively high temperatures during operation of the electric machine, the temperatures are not so high as to cause the body of the jacket to expand to a point where the fit between the stator 7 and the inner shell 25 becomes loose.

The cooling jacket design described above could be modified to have different numbers and arrangements of flow channels, fins and dividers to provide for serpentine flow through the jacket. For example, each flow path could have more or less parallel sections than the four sections shown in FIG. 11. Further, the inlet and outlet points could be varied to vary the number of serpentine flow paths. For example, there could be one, two or more serpentine flow paths. The particular arrangement used for a given application will depend on size, heat transfer requirements, and possibly other factors.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A cooling jacket assembly for cooling a stator of an electric machine, said assembly comprising
an annular cooling jacket body comprising coaxial inner and outer cylindric extruded shells defining an annular gap therebetween,
said inner shell having an outer surface and a cylindric inner surface defining a cylindric cavity for receiving said stator so that the stator is in heat transfer contact with said inner surface,
heat transfer fins in the annular space between the inner and outer shells defining flow channels for flow of coolant therethrough,
a first annular end cap connected to one end of the cooling jacket body and defining an annular conduit around the body in fluid communication with said flow channels,
a second annular end cap connected to an opposite end of the cooling jacket body and defining an annular conduit around the body in fluid communication with said flow channels,
an inlet on one of the end caps for flow of coolant into a respective conduit,
an outlet on one of the end caps for flow of coolant out of a respective conduit, and
barriers in the conduits for directing fluid from the inlet through the flow channels to the outlet along at least one serpentine path, said at least one path comprising a plurality of parallel sections extending axially of the cooling jacket body and connected by said conduits, each section of said at least one serpentine path comprising a group of two or more flow channels defined by a plurality of adjacent fins.

2. An assembly as set forth in claim 1 further comprising at least one ramp in said conduits extending across the inlet end of at least one of said parallel sections for effecting a more uniform distribution of fluid through the flow channels of said at least one section.

3. An assembly as set forth in claim 2 wherein said inner and outer shells are separate extruded parts.

4. An assembly as set forth in claim 1 further comprising cooperating registration elements on the cooling jacket body and the first and second end caps for properly orienting the end caps relative to the body during assembly of the body and the end caps.

5. An assembly as set forth in claim 4 wherein said registration elements comprise recesses formed in said end caps and axial projections formed as integral parts of the cooling jacket body receivable in said recesses.

6. An assembly as set forth in claim 4 wherein said inner and outer shells are separate parts and said fins are formed on the inner shell, and wherein the outer shell has a plurality of axial slots therein running from generally adjacent one end of the outer shell to generally adjacent the other end of the outer shell for receiving selected fins on the inner shell, said slots defining said parallel sections of said at least one serpentine path.

7. An assembly as set forth in claim 4 further comprising means on selected fins for visually identifying the fins to be received in said axial slots to facilitate assembly of the inner and outer shells.

8. An assembly as set forth in claim 6 wherein each slot is defined by a pair of closely spaced ribs, said ribs having end portions defining said axial projections receivable in said recesses in the end caps.

9. An assembly as set forth in claim 1 further comprising a connector secured to the first end cap for electrically connecting the stator to a power line.

10. An assembly as set forth in claim 1 further comprising a deflector adjacent the inlet for deflecting coolant into a respective conduit for flow in opposite circumferential directions relative to the cooling jacket body, said barriers being arranged to direct coolant along two separate serpentine paths through said coolant body.

11. A cooling jacket assembly for cooling a stator of an electric machine, said assembly comprising
an annular cooling jacket body comprising coaxial inner and outer cylindric extruded shells defining an annular gap therebetween,
said inner shell having an outer surface and a cylindric inner surface defining a cylindric cavity for receiving said stator so that the stator is in heat transfer contact with said inner surface,
heat transfer fins in the annular space between the inner and outer shells defining flow channels for flow of coolant therethrough,
a first annular end cap connected to one end of the cooling jacket body and defining an annular conduit around the body in fluid communication with said flow channels,
a second annular end cap connected to an opposite end of the cooling jacket body and defining an annular conduit around the body in fluid communication with said flow channels,
an inlet on one of the end caps for flow of coolant into a respective conduit,
an outlet on one of the end caps for flow of coolant out of a respective conduit,
barriers in the conduits for directing fluid from the inlet through the flow channels to the outlet along at least one serpentine path, said at least one path comprising at least first, second and third parallel sections extending axially of the cooling jacket body and connected by said conduits, each section of said at least one serpentine path comprising a group of flow channels defined by a plurality of adjacent fins,
the arrangement being such that coolant flows in a first axial direction through the flow channels of the first section, then in a second axial direction substantially opposite the first through the flow channels of the second section, and then in said first axial direction through the flow channels of the third section.

12. A cooling jacket assembly as set forth in claim 11 further comprising a deflector adjacent the inlet for deflecting coolant into a respective conduit for flow in opposite circumferential directions relative to the cooling jacket body, said barriers being arranged to direct coolant along two separate serpentine paths through said coolant body.

13. A cooling jacket assembly as set forth in claim 12 wherein said inlet and outlet are in the same end cap, and wherein said two serpentine paths end at said outlet for exit of coolant from the assembly.

14. A cooling jacket assembly for cooling a stator of an electric machine, said assembly comprising an annular cooling jacket body comprising coaxial inner and outer cylindric extruded shells defining an annular gap therebetween, said inner shell having an outer surface and a cylindric inner surface defining a cylindric cavity for receiving said stator so that the stator is in heat transfer contact with said inner surface, heat transfer fins in the annular space between the inner and outer shells defining flow channels for flow of coolant therethrough, a first annular end cap connected to one end of the cooling jacket body, a second annular end cap connected to an opposite end of the cooling jacket body, an inlet on one of the end caps for flow of coolant into the flow channels, an outlet on one of the end caps for flow of coolant from the flow channels, means for directing coolant from the inlet through the flow channels to the outlet along at least one serpentine path, and cooperating registration elements on the cooling jacket body and the first and second end caps for properly orienting the end caps relative to the body during assembly of the body and the end caps, said cooperating registration elements comprising integral axial projections formed as integral parts of either the cooling jacket body or the end caps and recesses in the other of the cooling jacket body and the end caps for receiving the integral axial projections.

15. An assembly as set forth in claim 14 wherein said inner and outer shells are separate parts and said fins are formed on the inner shell, and wherein the outer shell has a plurality of axial slots therein running from generally adjacent one end of the outer shell to generally adjacent the other end of the outer shell for receiving selected fins on the inner shell, said slots defining a plurality of parallel sections of said at least one serpentine path.

16. An assembly as set forth in claim 15 further comprising means on selected fins for visually identifying the fins to be received in said axial slots to facilitate assembly of the inner and outer shells.

17. An assembly as set forth in claim 15 wherein each slot is defined by a pair of closely spaced ribs, said ribs having end portions defining said integral axial projections receivable in said recesses in the end caps.

18. A cooling jacket assembly for cooling a stator of an electric machine, said assembly comprising an annular cooling jacket body comprising coaxial inner and outer cylindric extruded shells defining an annular gap therebetween, said inner shell having an outer surface and a cylindric inner surface defining a cylindric cavity for receiving said stator so that the stator is in heat transfer contact with said inner surface, heat transfer fins in the annular space between the inner and outer shells defining flow channels for flow of coolant therethrough, a first annular end cap connected to one end of the cooling jacket body and defining an annular conduit around the body in fluid communication with said flow channels, a second annular end cap connected to an opposite end of the cooling jacket body and defining an annular conduit around the body in fluid communication with said flow channels, an inlet on one of the end caps for flow of coolant into a respective conduit, an outlet on one of the end caps for flow of coolant out of a respective conduit, barriers in the conduits for directing fluid from the inlet through the flow channels to the outlet along at least one serpentine path, said at least one serpentine path comprising a plurality of parallel sections extending axially of the cooling jacket body and connected by said conduits, and at least one ramp in said conduits extending across the inlet end of at least one of said parallel sections for effecting a more uniform distribution of fluid through the flow channels of said at least one section.

* * * * *